(12) United States Patent
Chang et al.

(10) Patent No.: US 8,286,018 B2
(45) Date of Patent: Oct. 9, 2012

(54) POWER MANAGEMENT IN DATA STORAGE DEVICE DETERMINING UTILIZATION OF A CONTROL CIRCUIT BY ITS RATE OF COMMAND PROCESSING

(75) Inventors: Lai Kein Chang, Singapore (SG); Lucas KongYaw Lee, Singapore (SG); Kian Keong Ooi, Singapore (SG); Brian Nollinger Nollinger, Broomfield, CO (US); Robert W. Warren, Loveland, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 2239 days.

(21) Appl. No.: 10/881,270

(22) Filed: Jun. 29, 2004

(65) Prior Publication Data
US 2005/0289368 A1    Dec. 29, 2005

(51) Int. Cl.
*G06F 1/32* (2006.01)
(52) U.S. Cl. .................. 713/324; 711/113; 713/320
(58) Field of Classification Search .................. 713/320, 713/300, 324; 711/113
See application file for complete search history.

(56) References Cited

U.S. PATENT DOCUMENTS

| | | | |
|---|---|---|---|
| 5,408,369 A | 4/1995 | Miura | |
| 5,408,668 A | 4/1995 | Tornai | |
| 5,452,277 A | 9/1995 | Bajorek | |
| 5,483,464 A | 1/1996 | Song | |
| 5,560,023 A | 9/1996 | Crump | |
| 5,574,920 A | 11/1996 | Parry | |
| 5,682,273 A * | 10/1997 | Hetzler | ............... 360/75 |
| 5,742,800 A | 4/1998 | Forehand | |
| 5,784,628 A | 7/1998 | Reneris | |
| 5,799,199 A | 8/1998 | Ito | |
| 5,854,720 A * | 12/1998 | Shrinkle et al. | ............... 360/69 |
| 5,898,880 A | 4/1999 | Ryu | |
| 5,964,878 A | 10/1999 | Ryu | |
| 6,209,088 B1 | 3/2001 | Reneris | |
| 6,216,187 B1 | 4/2001 | Truong | |
| 6,272,645 B1 | 8/2001 | Wang | |
| 6,289,484 B1 * | 9/2001 | Rothberg et al. | ............ 714/769 |
| 6,725,385 B1 * | 4/2004 | Chu et al. | ................ 713/320 |
| 2003/0048683 A1 | 3/2003 | Lovett | |
| 2003/0058704 A1 | 3/2003 | Lovett | |
| 2003/0079149 A1 * | 4/2003 | Edwin | ................ 713/300 |
| 2004/0015731 A1 * | 1/2004 | Chu et al. | ................ 713/300 |

* cited by examiner

*Primary Examiner* — Albert Wang
(74) *Attorney, Agent, or Firm* — Hall Estill Attorneys at Law

(57) ABSTRACT

A power management circuit is provided for a data storage device that is adapted for communicating with a host via an interface circuit. The power management circuit is responsive to a utilization of a control circuit of the data storage device, determined independently of the communication between the data storage device and the host, in providing a supply power to the data storage device. A method is provided comprising connecting a data storage device with a host via an interface circuit; sending data transfer commands from the host to the interface circuit; and monitoring the utilization of a control circuit of the data storage device in terms of the rate at which commands are processed by the control circuit for use in selectively providing a supply power to the data storage device.

20 Claims, 4 Drawing Sheets

POWER MANAGEMENT IN DATA STORAGE DEVICE DETERMINING UTILIZATION OF A CONTROL CIRCUIT BY ITS RATE OF COMMAND PROCESSING

FIELD OF THE INVENTION

The embodiments of the present invention relate generally to the field of power conservation in a control system and more particularly but without limitation to an apparatus and associated method for adjusting a power supply to a data storage device based on an observed utilization of various control circuitry within the device.

BACKGROUND

Battery life for personal computing devices has become a leading market differentiator among manufacturers' product offerings. Battery-powered performance becomes more important as the size and power of processing circuits continually increases to keep pace with the proliferation of software and operating system requirements. Also, users are becoming ever-more reliant on longer-term and more reliable remote computing sessions.

Accordingly, system designers are continually working to extend the operating life of computing devices, such as notebooks and laptops, when running on battery power. Standards exist for power reduction schemes, such as the Advanced Power Management (APM) system which is published by Microsoft Corporation of Redmond, Wash. and Intel Corporation of Santa Clara, Calif. Computer systems that operate in accordance with the APM standard are responsive to idle calls from an operating system in detecting or predicting inactivity. In response to an idle call, each application program returns an idle indication to the operating system if it is, in fact, idle. The operating system initiates power savings routines if predetermined conditions exist regarding the state of the idle indications.

The APM system defines four power management states: a normal state, a standby state, a suspend state, and an off state. The normal state is substantially the same as a system operating under normal operating conditions that does not perform power reduction routines. The off state is substantially the same as a system that has been powered down and requires a full start up sequence when normal operation is resumed.

The standby state uses less power than the normal state, yet it leaves the complete state of the computer system intact and thus immediately available for continued operation as of the last command. In the suspend state, more drastic power management initiatives are sought for longer periods of inactivity. The goal here is to reach an absolute minimum power consumption while not requiring a full restart sequence when the suspend state is ended.

While various proposed power management methodologies such as the APM system have been found operable, with the continued increase in control circuit complexity, and the continued reliance on long-term battery powered usage, there remains a continued need for improvements in the manner in which power consumption is managed. It is to such improvements that the claimed invention is generally directed.

SUMMARY OF THE INVENTION

In accordance with preferred embodiments, an apparatus and method are provided for managing power consumption.

In some preferred embodiments, a power management circuit is provided for a device that is adapted to communicate with a host via an interface circuit. The power management circuit provides a supply power to the device in relation to a utilization of a control circuit of the device that is determined independently of the communication between the device and the host. The utilization can be defined in terms of a rate at which one or more commands are processed by the control circuit.

In other embodiments power management circuitry is provided for a data storage device that is adapted for communicating with a host via an interface circuit. The power management circuitry is responsive to a utilization of a control circuit of the data storage device, determined independently of the communication between the data storage device and the host, in adjusting a supply power to the data storage device. The utilization can be defined by a rate at which one or more commands are processed by the control circuit.

In other embodiments a method is provided comprising connecting a data storage device with a host via an interface circuit; sending data transfer commands from the host to the interface circuit; and monitoring the utilization of a control circuit of the data storage device in terms of the rate at which commands are processed by the control circuit for use in selectively providing a supply power to the data storage device.

These and various other features and advantages which characterize the claimed invention will become apparent upon reading the following detailed description and upon reviewing the associated drawings.

DETAILED DESCRIPTION

Figure 1:
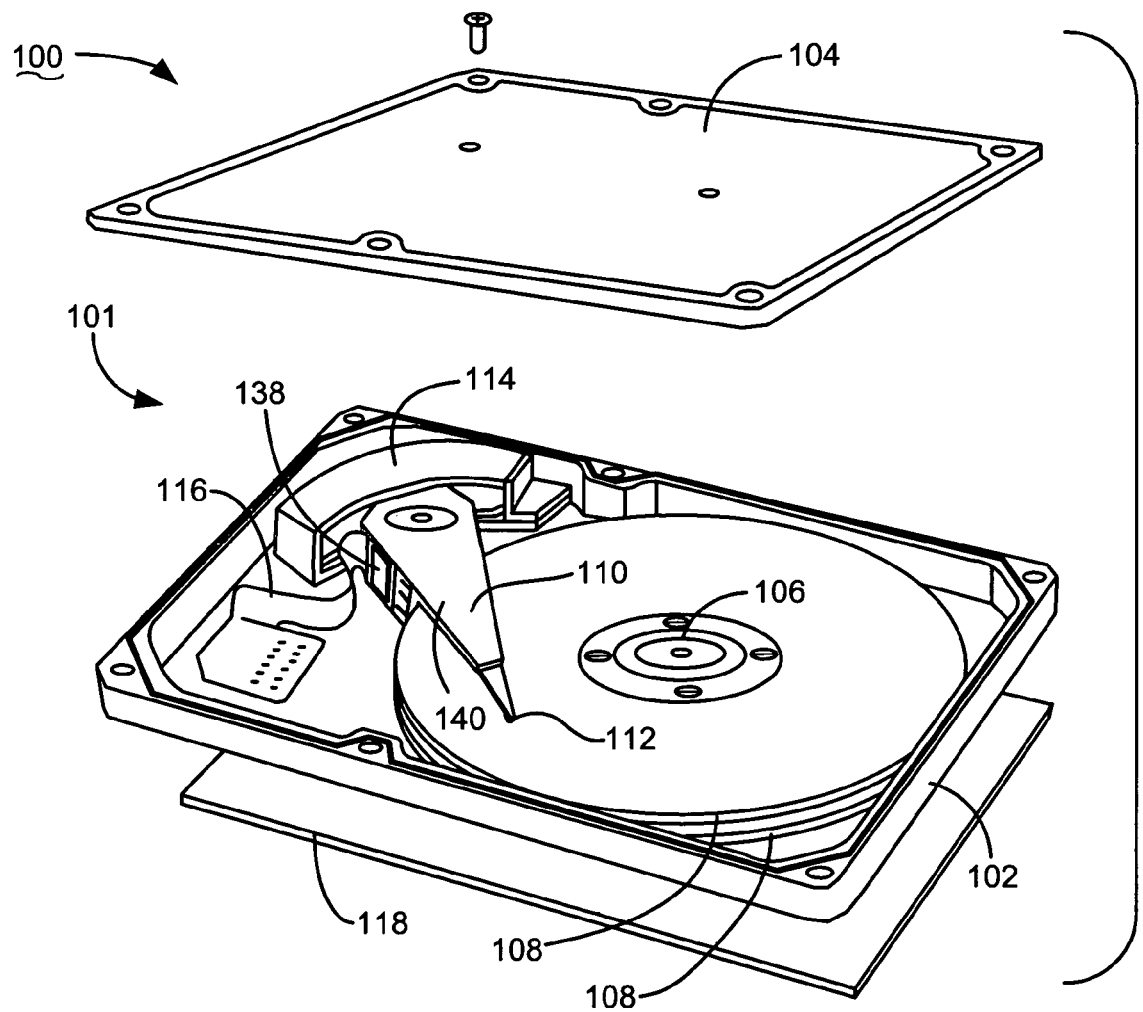
FIG. 1 is a perspective view of a data storage device constructed in accordance with embodiments of the present invention.

FIG. 1 is an exploded, perspective representation of a data storage device 100 of the type used in transferring data by magnetically storing and retrieving data. The device 100 includes a sealable housing 101 formed from a base deck 102 and a cover 104. The housing 101 provides a controlled interior environment for various constituent components of the device 100, including a spindle motor 106 which rotates a number of data storage discs 108, and an actuator 110 supporting a corresponding array of data transducing heads 112 adjacent the disc surfaces.

The actuator 110 is controllably positioned by a voice coil motor 114 that aligns the heads 112 with tracks (not shown) defined on the disc surfaces. A flex circuit assembly 116 provides electrical communication paths between the actuator 110 and control electronics supported on a printed circuit board assembly (PCBA) 118 mounted to the base deck 102.

Figure 2:
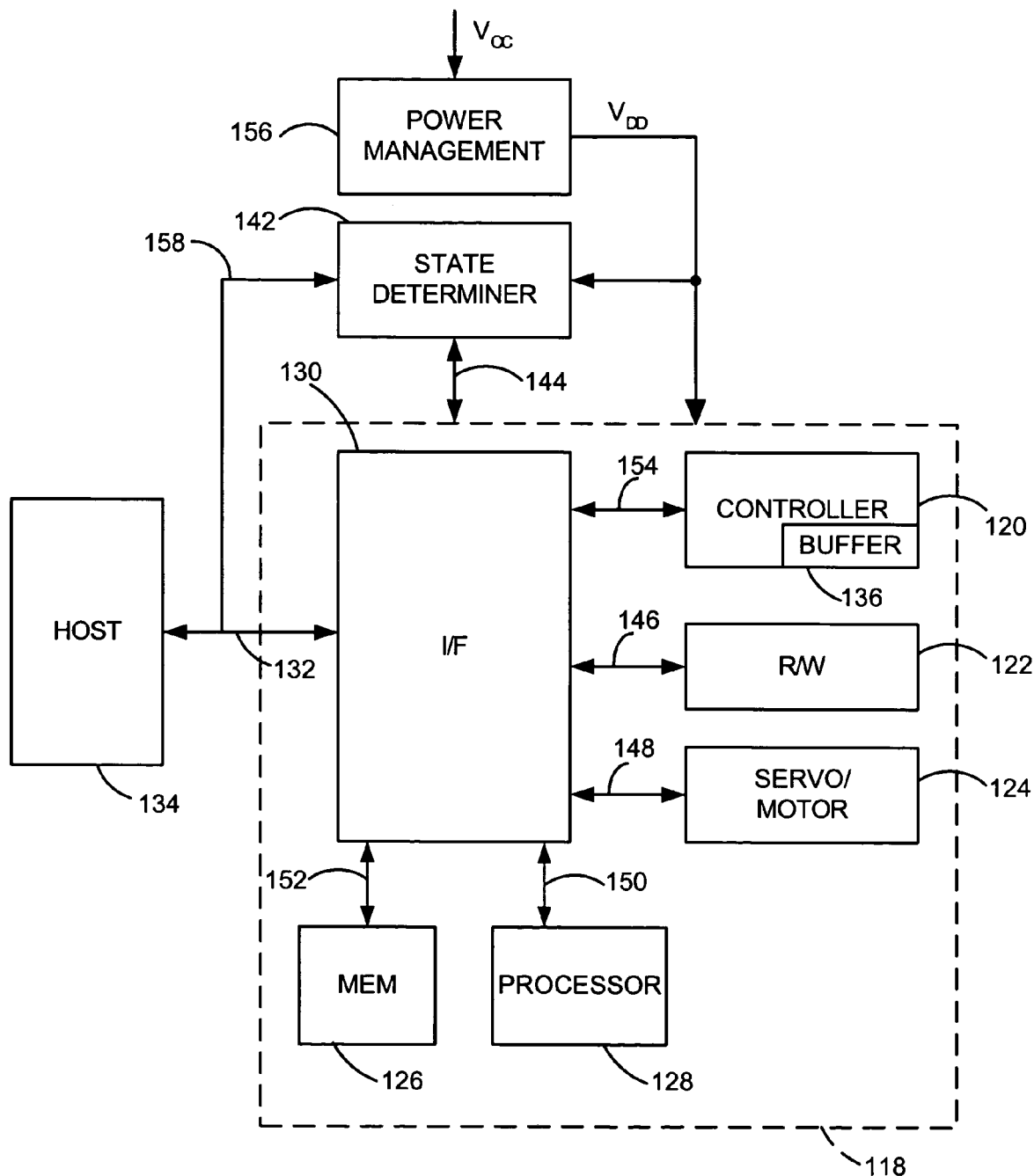
FIG. 2 is a block diagram of a control circuit of the data storage device of FIG. 1.

FIG. 2 provides a generalized functional block diagram of the data storage device 100 constructed in accordance with embodiments of the present invention. A controller 120, a read/write channel 122, a servo/motor control 124, a volatile memory 126 (such as a DRAM), and a processor 128 are all connected for intercommunication to an interface circuit 130 within the PCBA 118. The interface circuit 130 is connectable to an interface bus 132 for communication with a host 134. The controller 120 includes a buffer 136 that temporarily stores pending commands from the host 134. In alternative equivalent embodiments the buffer 136 can be resident elsewhere such as but not limited to the interface circuit 130.

The controller 120 provides top level control for the functions of the data storage device. For example, the controller 120 receives pending data transfer commands from the host 134 into the buffer 136, and executes the commands in either the volatile memory 126 or the nonvolatile data storage discs 108 (FIG. 1).

The read/write channel 122 cooperates with a preamplifier/driver circuit ("preamp") 138 (FIG. 1) to write data to the discs 108 during a write operation and to reconstruct data previously stored to the discs 108 during a read operation. The preamp 138 (FIG. 1) communicates with the heads 112 (FIG. 1) via flex on suspension ("FOS") conductors 140 (FIG. 1).

The servo/motor control 124 uses servo control data transduced from the disc surfaces to provide positional control for the heads 112. The servo/motor control 124 comprises a servo control circuit portion and a voice coil motor driver supplying current commands to the voice coil motor 114 (FIG. 1) in moving the actuator 110. The servo/motor control 124 also comprises a spindle control circuit and spindle driver supplying electrical signals for controlling the spindle motor 106.

The data storage device 100 comprises a state determiner 142 that communicates with a preselected number of the components of the PCBA 118 by data link 144. The state determiner 144 monitors the utilization of one or more of the components on the PCBA 118. By "utilization" it is meant that the component operates in response to one or more commands during a preselected time interval. If no responsive operations are performed within the time window, then the component is deemed to be "nonutilized."

The command activity over the interface bus 132 is not necessarily an accurate indicator of component utilization. For example, the transfer of a number of data transfer commands over the interface bus 132, in and of itself, would indicate the need to spin the data storage discs 108 for reading and/or writing data. However, if all the pending commands can be handled by the memory 126, then power savings can possibly be realized by either reducing power or turning off the motor 106 and actuator 110 and associated control electronics. For this reason, the utilization in the embodiments of the present invention is determined independently of the command activity over the interface bus 132 between the host 134 and the interface circuit 130.

More particularly, if data transfer commands that are being sent by the host 134 to the interface circuit 130 are entirely directed to the memory 126, then no commands will pass between the interface circuit 130 and the read/write channel 122 over the data link 146. In this case the state determiner 142 will, after a preselected time of no such command activity, deem the read/write channel 122 to be nonutilized. As such, the read/write channel 122 is a candidate for either reducing power or powering down in order to conserve power. In a similar manner, the state determiner 142 can monitor the utilization of the servo/motor control 124, the processor 128, the memory 126, and the controller 120 by data links 148, 150, 152, and 154, respectively, from the interface circuit 130.

The state determiner 142 can also be configured to monitor the utilization of a component in terms of self-executed routines; that is, routines that are not initiated by a command from the interface circuit 130. For example, the controller 120 can be programmed to execute idle-time data verification and/or data integrity routines. In this case the utilization is likewise determined independently of host 134 commands over the interface bus 132. In this case the distinction is that the commands are not received by the component from the interface circuit 130.

The data storage device further comprises a power management circuit 156 that is responsive to the state determiner 142 in providing a supply voltage $V_{dd}$ both to the state determiner 142 and to the components on the PCBA 118. The power management circuit 156 receives a primary voltage $V_{cc}$ and selectively imparts the supply voltage $V_{dd}$ to the data storage device 100 in accordance with embodiments of the present invention. The voltages $V_{cc}$ and $V_{dd}$ are nominally equal and can be any suitable voltage level such as +5.0 VDC, +3.3 VDC, etc.

It will be noted that in the embodiments illustrated by FIG. 2 the power management circuit 156 and the state determiner 142 are not included as components of the PCBA 118. In alternative equivalent embodiments either or both can be so provided on the PCBA 118, and can be resident in one or more of the components on the PCBA 118.

This arrangement can be utilized to conserve power by powering down nonutilized control circuits. In illustrative embodiments there are four defined power modes; namely, an active mode, and three reduced power modes: an idle mode, a standby mode, and a sleep mode.

In the active mode the supply power $V_{dd}$ is on, and all components are fully powered. If, after a predefined time interval the state determiner 142 observes that the read/write channel 122 is nonutilized, then the controller 120 can be signaled to invoke a reduced-power idle mode. In alternative equivalent embodiments, the power-reduction circuitry can be resident elsewhere, such as in the state determiner 142 or the individual components such as the read/write channel 122.

In the idle mode power is turned off to both the preamp 138 and the read/write channel 122. The actuator 110 can also be parked and power turned off to the servo control circuit and to the voice coil motor driver. Further power reductions are possible in the idle mode by turning power off to portions of the controller 120 and the microprocessor 128 that are only needed for the functions associated with the read/write channel 122 and the servo/motor control 124.

If, after the idle mode is invoked and another predefined time interval passes in which the state determiner deems the servo/motor control 124 to be nonutilized, then the controller 120 can be signaled to invoke the standby mode. In the standby mode the power is turned off to the spindle motor 106, and to the spindle control and the spindle driver portions of the servo/motor control 124.

If, after the standby mode is invoked and another predefined time interval passes in which the state determiner 142 observes no data transfer commands being received into the buffer 136, then the sleep mode can be invoked. To invoke the sleep mode, the power management circuit 156 is responsive to a sleep command from the state determiner 142 in turning off the supply power $V_{dd}$. This removes power from the entire PCBA 118, except for an interface monitor data link 158 that monitors any activity over the interface bus 132. Accordingly, except for the data link 158, the entire PCBA 118 is in a quiescent state, making it possible to reduce total power consumption of the data storage device 100 to levels of less than 500 microamperes. Because all power to the PCBA 118 is turned off in the sleep mode, the states of the components must be saved to nonvolatile memory as needed for a restart. For example, data and or commands stored in the memory 126 and the buffer 136 can be written to the data storage discs 108 before invoking the sleep mode.

In the sleep mode, the state determiner 142 is responsive to any activity over the data link 158 in signaling the power management circuit 156 to supply power $V_{dd}$ to the PCBA 118. However, preferably not all activity over the interface bus 132 will return the data storage device 100 to the active power mode. For example, a periodic handshake signal from the host 134 could result in powering just enough of the controller 120 and the interface circuit 130 to respond to the command inquiry. Furthermore, a data write command from the host 134 which can be accommodated within the memory 126 can be written there to prevent the need for spinning up the data storage discs 108.

More generally speaking, preferably a hierarchy-scheme is defined for powering the components up from a sleep mode. Upon any detection of a communication attempt through the interface bus 132, the power management circuit 156 turns on $V_{dd}$ to supply power to the PCBA 118. However, the controller 120 and the interface circuit 130 (lowest power level in the hierarchy) are powered only to the extent necessary to communicate with the host 134. If additional control circuits are required to process the host 134 communication, then a next level in the hierarchy is powered, as illustrated in the example discussion above. Powering the components according to the hierarchy continues until the device 100 is capable of processing the host 134 communications.

Any number of other desired control functions can be incorporated into this arrangement in order to reduce the operating power requirements of the data storage device 100. For example, while in the sleep mode or in the standby mode, the data storage discs 108 can be spun up in order to transfer data stored in the memory 126. Afterward, the data storage device 100 can return to the standby mode or sleep mode.

Figure 3:
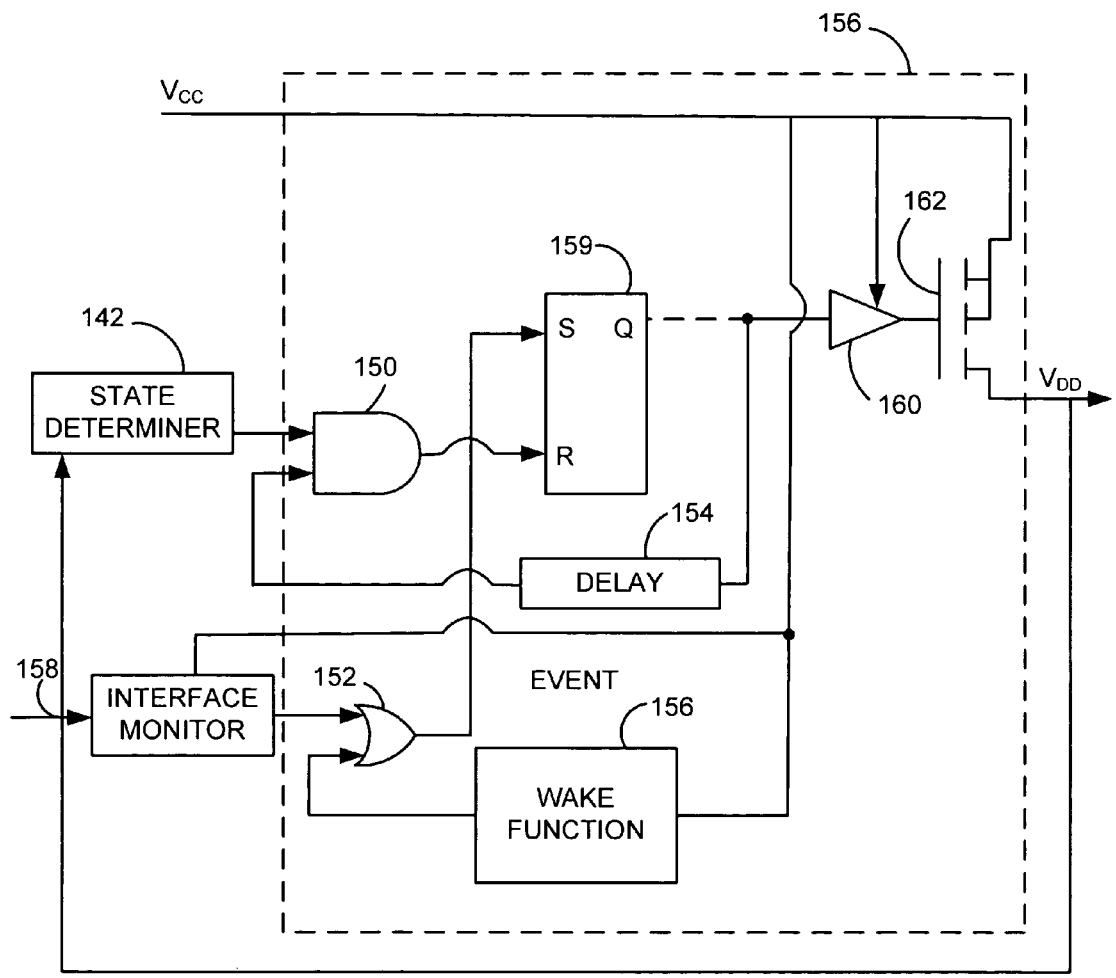
FIG. 3 is a block diagram of a power management circuit of the control circuit of FIG. 2.

FIG. 3 illustrates a power management circuit 156 constructed in accordance with embodiments of the present invention. Here, the power management circuit 156 is powered by $V_{cc}$ and generally includes a triggerable register, or as illustrated, an S-R (Set/Reset) latch 159, that defaults to the set position upon powering up. In the set position, the S-R latch 159 transmits an appropriate output value, Q (such as a logical bit 1), that is passed via the amplifier 160 to the gate of the switch 162. This closes the switch 162, thereby conducting $V_{dd}$ to the PCBA 118 (FIG. 2). The S-R latch 159 is responsive to a sleep signal from the state determiner 142, via AND gate 150, in opening the switch 162 and thereby removing the supply power $V_{dd}$ from the PCBA 118.

As discussed above, the power savings features of the embodiments of the present invention are directly related to fact that all components of the PCBA 118, including the interface circuit 130, are turned off during a sleep mode. Likewise, the state determiner 142, whether part of the PCBA 118 or not, is preferably powered by $V_{dd}$. Because the state determiner 142 can electrically oscillate while powering up, a delay circuit 154 is combined with the state determiner 142 into the AND gate 150 to prevent a premature reset of the latch 159.

After the sleep mode has been invoked, the S-R latch 159 is triggered for again providing the supply power $V_{dd}$ to the PCBA 118 by either the data link 158 or by a wake function 156, both being input to a logical OR gate 152. The wake function 156 can be a timer, for example, adapted to trigger an event signal at a desired time interval.

Figure 4:
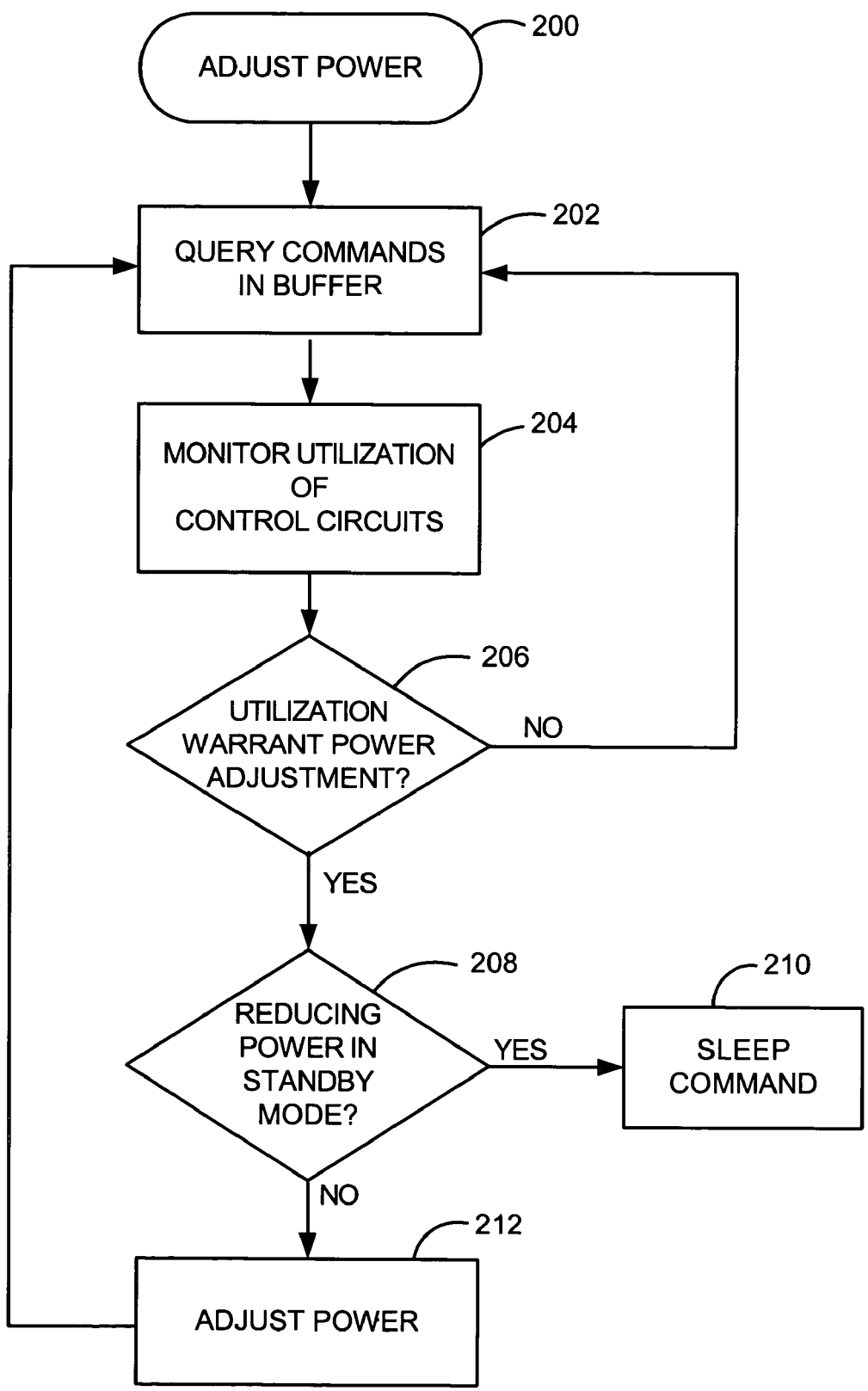
FIG. 4 is a flowchart for an ADJUST POWER routine generally illustrative of steps carried out by the embodiments of FIGS. 1-3 in accordance with embodiments of the present invention.

FIG. 4 provides a flowchart for an ADJUST POWER routine 200 generally illustrative of steps carried out by the device 100 in accordance with preferred embodiments of the present invention. The routine begins in block 202 by querying the buffer 136 for commands received from the host 134. In block 204 the routine monitors the utilization of one or more selected components on the PCBA 118. Decision block 206 determines whether the current utilization states in view of the pending buffered commands warrants adjusting, that is either increasing or decreasing, the power mode. If no, then control returns to block 202. If yes, then the routine continues to decision block 208 which determines whether a power reduction is warranted at a time when the data storage device 100 is in the standby mode. If yes, then in block 210 the state determiner 142 sends a sleep command to turn off the supply power $V_{dd}$. If no, then the power mode is adjusted in block 212 and control returns to block 202.

Summarizing generally, embodiments of the present invention contemplate a power management circuit (such as 156) for a device (such as 100) that is adapted to communicate with a host (such as 134) via an interface circuit (such as 130). The power management circuit provides a supply power (such as $V_{dd}$) to the device in relation to a utilization of a control circuit (such as 120, 122, 124, 126, 128, 130) of the device that is determined independently of the communication between the device and the host.

The power management circuit can be responsive to state determining circuitry (such as 142) defining the utilization of the control circuit in terms of a rate at which one or more commands are processed by the control circuit. In some embodiments the one or more commands are received by the control circuit from the interface circuit. The state determining circuitry can selectively adjust supply power to at least a portion of the control circuit while supplying power to the device based on the observed utilization of the control circuit. In some embodiments the state determining circuitry selectively adjusts supply power to a nonvolatile memory (such as 108) while supplying substantially constant power to a volatile memory (such as 126) of the device.

The power management circuitry can be provided in a data storage device that is adapted for communicating with a host via an interface circuit. The power management circuitry is responsive to a utilization of a control circuit of the data storage device, determined independently of the communication between the data storage device and the host, in providing a supply power to the data storage device.

The power management circuitry can be responsive to state determining circuitry defining the utilization of the control circuit by a rate at which one or more commands are processed by the control circuit. The one or more commands can be received by the control circuit from the interface circuit.

In some embodiments the state determining circuitry selectively adjusts supply power to at least a portion of the control circuit while supplying power to the data storage device based on an observed utilization of the control circuit. For example, the state determining circuitry can selectively adjust supply power to a nonvolatile memory while supplying substantially constant power to a volatile memory of the data storage device.

Where the observed utilization warrants, the power management circuitry can respond to a sleep command in turning off the supply power $V_{dd}$. The power management circuitry can furthermore comprise a wake function for energizing the control circuit subsequent to the sleep command. Accordingly, the power management circuitry can comprise a set/reset latch that is responsive to the state determining circuitry and the wake function, and a switch that is responsive to the latch for providing the supply power to the data storage device. Preferably, the power management circuit controls supply power to the interface circuit portion of the data storage device.

In other embodiments of the present invention a method is provided comprising connecting a data storage device with a host via an interface circuit; sending data transfer commands from the host to the interface circuit; and monitoring the utilization of a control circuit of the data storage device in terms of the rate at which commands are processed by the control circuit. The method can further comprise adjusting a supply power to the data storage device based on the utilization of the control circuit.

In some embodiments the monitoring step can comprise monitoring the rate at which commands are sent from the interface circuit to the control circuit. The adjusting a supply power step can comprise adjusting the supply power to a nonvolatile memory of the data storage device while supplying a substantially constant supply power to a volatile memory of the data storage device, based on the observed utilization of the nonvolatile memory. The adjusting a supply power step can further comprise issuing a sleep command on the basis of the observed utilization of a preselected number of control circuits.

For purposes of the appended claims, the terms "circuit" and "circuitry" will be broadly defined as an arrangement of hardware, software, firmware, or a combination thereof, and may be integrated into a single device or may be distributed among a number of different devices.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular placement and configuration of the power management circuitry, the state determining circuitry, and the power-adjusting circuitry within the PCBA, especially with regard to incorporation within integrated circuits, without departing from the spirit and scope of the present invention.

What is claimed is:

1. A data storage device adapted for external communication with a host via an interface circuit, the data storage device comprising power management circuitry providing a supply power to a control circuit of the data storage device in response to a utilization of the control circuit that is determined independently of the external communication with the host via the interface circuit by a rate at which one or more commands are processed by the control circuit.

2. The device of claim 1 wherein the power management circuitry selectively adjusts supply power to at least a portion of the control circuit while supplying power to the data storage device based on the utilization of the control circuit.

3. The device of claim 1 wherein the power management circuitry selectively adjusts supply power to a nonvolatile memory while supplying substantially constant power to a volatile memory of the data storage device.

4. The device of claim 1 wherein the one or more commands are received by the control circuit from the interface circuit.

5. The device of claim 1 further comprising state determining circuitry operably issuing a sleep command based on the utilization of the control circuit.

6. The device of claim 5 comprising a wake function for energizing the control circuit subsequent to the sleep command.

7. The device of claim 6 comprising a set/reset latch that is responsive to the state determining circuitry and the wake function for providing the supply power to the data storage device.

8. The device of claim 7 comprising a switch that is responsive to the latch for providing the supply power to the data storage device.

9. The device of claim 8, wherein the power management circuitry further selectively powers the interface circuit of the data storage device.

10. A data storage device adapted for external communication with a host via an interface circuit, the data storage device comprising state determining circuitry defining the utilization of a control circuit of the data storage device independently of the external communication with the host via the interface circuit by a rate at which one or more commands are processed by the control circuit, and power management circuitry responsive to the state determining circuitry selectively adjusting supply power to a nonvolatile memory while supplying substantially constant power to a volatile memory of the data storage device based on the defined utilization.

11. The data storage device of claim 10 wherein the power management circuitry selectively adjusts supply power to at least a portion of the control circuit while supplying power to the data storage device based on the utilization of the control circuit.

12. The data storage device of claim 10 wherein the one or more commands are received by the control circuit via the interface circuit.

13. The data storage device of claim 10 further comprising state determining circuitry operably issuing a sleep command based on the utilization of the control circuit.

14. The data storage device of claim 13 further comprising a wake function operably energizing the control circuit subsequent to the sleep command.

15. The data storage device of claim 14 further comprising a set/reset latch operably responsive to the state determining circuitry and the wake function to enable the supply power to the data storage device.

16. The data storage device of claim 15 further comprising a switch that operably responsive to the set/reset latch to communicate the supply power to the data storage device.

17. The data storage device of claim 10 wherein the power management circuitry further selectively adjusts the power to the interface circuit of the data storage device.

18. The data storage device of claim 10 wherein the state determining circuitry simultaneously defines the respective utilizations of two different control circuits of the data storage device.

19. A method comprising:
  obtaining a data storage device adapted for external communication with a host via an interface circuit;
  monitoring the utilization of a control circuit of the data storage device independently of the external communication with the host via the interface circuit by a rate at which one or more commands are processed by the control circuit to define the utilization of the control circuit; and
  selectively adjusting supply power to a nonvolatile memory of the data storage device while supplying substantially constant power to a volatile memory of the data storage device based on the defined utilization.

20. The method of claim 19 wherein the monitoring step is characterized by simultaneously monitoring the respective utilizations of two different control circuits of the data storage device.

* * * * *